United States Patent
Singh

(12) 
(10) Patent No.: US 9,961,209 B2
(45) Date of Patent: May 1, 2018

(54) CODEC SELECTION OPTIMIZATION

(71) Applicant: iBasis, Inc., Lexington, MA (US)

(72) Inventor: Manpreet Singh, Ellington, CT (US)

(73) Assignee: IBASIS, INC., Lexington, MA (US)

( * ) Notice: Subject to any disclaimer, the term of this patent is extended or adjusted under 35 U.S.C. 154(b) by 112 days.

(21) Appl. No.: 14/751,645

(22) Filed: Jun. 26, 2015

(65) Prior Publication Data
US 2016/0381229 A1 Dec. 29, 2016

(51) Int. Cl.
| | | |
|---|---|---|
| H04L 12/16 | (2006.01) | |
| H04M 7/00 | (2006.01) | |
| H04L 29/06 | (2006.01) | |
| H04W 88/18 | (2009.01) | |

(52) U.S. Cl.
CPC ...... H04M 7/0072 (2013.01); H04L 65/1006 (2013.01); H04L 65/1069 (2013.01); H04L 65/605 (2013.01); H04W 88/181 (2013.01)

(58) Field of Classification Search
CPC ....... H04M 15/66; H04M 7/006; H04L 65/00; H04L 65/1006; H04L 65/605
USPC ....................................... 370/259
See application file for complete search history.

(56) References Cited

U.S. PATENT DOCUMENTS

| | | | |
|---|---|---|---|
| 2004/0095958 A1 | 5/2004 | Ejzak | |
| 2007/0076591 A1* | 4/2007 | Khan | ............... H04L 12/4625 370/216 |

FOREIGN PATENT DOCUMENTS

WO WO 2007/035572 3/2007

OTHER PUBLICATIONS

3rd Generation Partnership Project; Technical Specification Group Core Network and Terminals; IP multimedia call control protocol based on Session Initiation Protocol (SIP) and Session Description Protocol (SDP); retrieved from the Internet: URL:http://www.3gpp.orgjftpjSpecsjlatest/Rel-13/24 series/ (2014).
The International Search Report for PCT/US2016/038981, entitled: "Codec Selection Optimization," dated Sep. 22, 2016.

* cited by examiner

Primary Examiner — Chi H Pham
Assistant Examiner — Alexander O Boakye
(74) Attorney, Agent, or Firm — Hamilton, Brook, Smith & Reynolds, P.C.

(57) ABSTRACT

Methods and apparatuses provide for listing codecs for offers and for providing an effective listing of codecs for answers. For example, a method relating to offers is provided which includes receiving an incoming offer that lists a plurality of codecs, determining for each of the plurality of codecs whether one or more related codecs are not listed in the incoming offer, generating an outgoing offer that lists the plurality of codecs and the one or more related codecs that were determined not to be listed in the incoming offer, and transmitting the outgoing offer.

21 Claims, 13 Drawing Sheets

```
Content-Type: application/sdp
Content-Length: 267
v=0
o=testsbc 1432213577 1432213577 IN IP4 1.2.3.3
s=sip call
c=IN IP4 1.2.3.4
t=0 0
m=audio 47980 RTP/AVP 100 104 103
a=rtpmap:100 SILK_V3/24000
a=rtpmap:104 SILK_WB_V3/16000
a=rtpmap:103 SILK_NB_V3/8000
```

300

310
321
322
323

FIG. 3A
(Incoming Offer)

350 →

```
Content-Type: application/sdp
Content-Length: 367
v=0
o=testsbc 1432213577 1432213577 IN IP4 2.3.4.5
s=sip call
c=IN IP4 2.3.4.6
t=0 0
m=audio 22218 RTP/AVP 100 104 113 9 103 0 8
a=rtpmap:100 SILK_V3/24000
a=rtpmap:104 SILK_WB_V3/16000
a=rtpmap:103 SILK_NB_V3/8000
a=rtpmap:8 pcma/8000
a=rtpmap:0 pcmu/8000
a=rtpmap:9 g722/8000
a=rtpmap:113 AMR-WB/16000
```

360 — m=audio line
371 — 373 — 374 — 375 — 376 — 377

FIG. 3B
(Outgoing Offer)

```
401 →    Content-Type: application/sdp
         Content-Length: 267
         v=0
         o=testsbc 1432213577 1432213577 IN IP4 1.2.3.3
         s=sip call
         c=IN IP4 1.2.3.4
         t=0 0
    410  m=audio 47980 RTP/AVP 8
    411  a=rtpmap:8 pcma/8000
```

FIG. 4A
(Incoming Offer)

402 →

Content-Type: application/sdp
Content-Length: 367
v=0
o=testsbc 1432213577 1432213577 IN IP4 2.3.4.5
s=sip call
c=IN IP4 2.3.4.6
t=0 0
m=audio 22218 RTP/AVP 8 0 18 104   — 420
a=rtpmap:18 G729/8000   — 421
a=fmtp:18 annexb=no   — 422
a=rtpmap:104 G729/8000   — 423
a=fmtp:104 annexb=yes   — 424
a=rtpmap:8 pcma/8000   — 425
a=rtpmap:0 pcmu/8000   — 426

FIG. 4B
(Outgoing Offer)

701

```
Content-Type: application/sdp
Content-Length: 267
v=0
o=testsbc 1432213577 1432213577 IN IP4 1.2.3.3
s=sip call
c=IN IP4 1.2.3.4
t=0 0
m=audio 47980 RTP/AVP 113 0
a=rtpmap:113 AMR-WB/16000
a=rtpmap:0 pcmu/8000
```

710 — 711 — 712

FIG. 7A
(Incoming Offer)

```
Content-Type: application/sdp
Content-Length: 367
v=0
o=testsbc 1432213577 1432213577 IN IP4 2.3.4.5
s=sip call
c=IN IP4 2.3.4.6
t=0 0
```
720 — m=audio 22218 RTP/AVP 113 9 100 104 105 0 8
721 — a=rtpmap:113 AMR-WB/16000
722 — a=rtpmap:9 g722/8000
723 — a=rtpmap:100 SILK_V3/24000
724 — a=rtpmap:104 SILK_WB_V3/16000
725 — a=rtpmap:105 opus/48000/2
726 — a=rtpmap:0 pcmu/8000
727 — a=rtpmap:8 pcma/8000

FIG. 7B
(Outgoing Offer)

703

Content-Type: application/sdp
Content-Length: 367
v=0
o=testsbc 1432213577 1432213577 IN IP4 2.3.4.8
s=sip call
c=IN IP4 2.3.4.10
t=0 0
m=audio 22218 RTP/AVP 8      730
a=rtpmap:8 pcma/8000         731

FIG. 7C
(Incoming Answer)

704 →

```
Content-Type: application/sdp
Content-Length: 367
v=0
o=testsbc 1432213577 1432213577
IN IP4 2.3.4.5
s=sip call
c=IN IP4 2.3.4.6
t=0 0
m=audio 222 RTP/AVP 0
a=rtpmap:0 pcmu/8000
```

740 — (m=audio line)
741 — (a=rtpmap line)

FIG. 7D
(Outgoing Answer)

CODEC SELECTION OPTIMIZATION

BACKGROUND

Communication endpoints, such as fixed telephones and mobile handsets, can use the Session Initiation Protocol (SIP) to assist in establishing communications with other endpoints. SIP is a signaling protocol for establishing and controlling communication sessions. For example, voice and video over Internet protocol can use SIP to facilitate these communications. The SIP protocol controls how the communication sessions are set up and terminated. SIP works with other protocols to identify and establish the sessions, such as the Session Description Protocol (SDP), which helps to identify and negotiate which codec(s) are used for the session, among other things.

SDP can be used for negotiating between endpoints a number of session parameters, such as media type and which codec is preferred to use. A codec (coder/decoder) can be used for audio or video communications and typically is an algorithm used to encode an audio signal into a digital stream for communication over a network and to decode the digital stream back to audio for presentation at the receiver.

Endpoints can be IP based wireless or wireline handsets, for example. Further, different handsets or network elements can have different codec capabilities which results in transcoding between various voice and video codecs. Transcoders can be used to perform this function, and can be located at the core or edge of a network.

In typical network setups, transcoding systems receive a list of codecs available to an endpoint and the transcoder can either generate its own static list or pass the received list transparently in the outgoing offer. Such static lists can be based on such things as the incoming customer trunk group or the outgoing provider/vendor trunk group. However, the incoming offers can vary, including due to different types of handsets and radio conditions. Typical transcoders can cause unnecessary or inefficient transcoding. Transcoding codecs can create issues as to processing requirements and voice quality.

SUMMARY

An example embodiment of the present disclosure is a method for listing codecs, which includes receiving an incoming offer that lists multiple codecs, determining for each of the multiple codecs whether one or more related codecs are not listed in the incoming offer, generating an outgoing offer that lists the multiple codecs and the one or more related codecs determined not to be listed in the incoming offer, and transmitting the outgoing offer. Certain additional embodiments can also maintain the order of the multiple codecs from the incoming offer as the order of the multiple codecs in the outgoing offer.

For some example embodiments, generating an outgoing offer that lists the multiple codecs and the one or more related codecs includes generating an outgoing offer that lists the multiple codecs and that lists the one or more related codecs, if they are not already listed in the outgoing offer, after each of the multiple codecs to which they relate, after any of the multiple codecs that are related to the one or more related codecs, and before a next unrelated codec of the multiple codecs. Yet other example embodiments also include listing one or more of a family of codecs in the outgoing offer when none of the family of codecs is listed in the incoming offer.

Yet other example embodiments also include listing a high definition codec in the outgoing offer that is not listed in the incoming offer when a high definition codec is listed in the incoming offer. For certain embodiments, a high definition codec that is not listed in the incoming offer is listed as a next available codec in the outgoing offer after the high definition codec that was listed in the incoming offer is listed in the outgoing offer. For certain example embodiments, high definition codecs include Adaptive Multi-Rate Wideband (AMR-WB, which is also called G722.2), Opus-WB (which is an Opus implementation having a sampling rate of 16 kHz or greater, and which was developed by IETF and released in 2012), G722 (approved in 1988 by the International Telecommunication Union-Telecommunication Standardization Sector (ITU-T)), SILK-WB (which is a SILK implementation having a sampling rate of 16 kHz or greater, and which was developed by Skype Limited), and EVRC-NW-16 (which is an EVRC-NW implementation having a 16 kHz sampling rate).

Certain example embodiments also include listing a narrowband codec in the outgoing offer that is not listed in the incoming offer when a narrowband codec is listed in the incoming offer. These narrowband codecs can include Adaptive Multi-Rate Narrowband (AMR or AMR-NB), G711a (G711 ITU-T standard released in 1972 called Pulse Code Modulation of voice frequencies using the a-law companding algorithm (PCMa)), G711u (the G711 standard using the u-law companding algorithm (PCMu)), G729 (an ITU-T codec called Coding of speech at 8 kbit/s using code-excited linear prediction speech coding (CS-ACELP)), G729a (the A annex to G729), G729b (the B annex to G729), Opus-NB (Opus implementation having a sampling rate of 8 kHz or less), SILK-NB (SILK implementation having a sampling rate of 8 kHz or less), G.723.1, G.726, EVRC, EVRC-NW-8 (which is an EVRC-NW implementation having a sampling rate of 8 kHz) and GSM.

Another example embodiment of the present disclosure is an apparatus for listing codecs, which includes a transcoder that is configured to: receive an incoming offer that lists multiple codecs, determine for each of the multiple codecs whether one or more related codecs are not listed in the incoming offer, generate an outgoing offer that lists the multiple codecs and the one or more related codecs determined not to be listed in the incoming offer, and transmit the outgoing offer. Certain of these example embodiments can have the transcoder configured to generate an outgoing offer that lists the multiple codecs and that lists the one or more related codecs, if they are not already listed in the outgoing offer, after each of the multiple codecs to which they relate, after any of the multiple codecs that are related to the one or more related codecs, and before a next unrelated codec of the multiple codecs.

An additional example embodiment is a method for a transcoder to provide a listing of codecs, which includes receiving an incoming answer that lists one or more codecs in response to an outgoing offer, determining whether an incoming offer that corresponds to the outgoing offer lists a high definition codec, determining whether the one or more codecs listed in the incoming answer include a high definition codec, determining a narrowband codec that is listed in the incoming offer when the one or more codecs listed in the incoming answer do not include a high definition codec and the one or more codecs do not match any of the codecs in the incoming offer and the incoming offer includes a high definition codec, and transmitting an outgoing answer listing the narrowband codec. For certain embodiments of this example method, the narrowband codec is listed in the outgoing answer as having the highest priority of codecs preferably used. For certain embodiments of this example method, the narrowband codec is listed in the incoming answer as having the highest priority of codecs preferably used. Certain of the example embodiments have the first high definition codec and second high definition codec be one of the AMR-WB, Opus-WB, G722, EVRC-NW-16, or SILK-WB codecs. Certain of the example embodiments have the narrowband codec be one of the AMR-NB, G711a, G711u, G729, G729a, G729b, Opus-NB, SILK-NB, G.723.1, G.726, EVRC, EVRC-NW-8, or GSM codecs.

Yet another additional example embodiment of the present disclosure is an apparatus for listing of codecs, which includes a transcoder configured to: receive an incoming answer that lists one or more codecs in response to an outgoing offer, determine whether an incoming offer that corresponds to the outgoing offer lists a first codec that is high definition, determine whether the one or more codecs listed in the incoming answer include a second codec that is high definition, determine a narrowband codec that is listed in the incoming offer when the one or more codecs listed in the incoming answer do not include the second codec that is high definition and the incoming offer includes the first codec that is high definition, and transmit an outgoing answer listing the narrowband codec.

Yet another additional example embodiment of the present disclosure is a method for a transcoder to provide a listing of codecs, which includes receiving an incoming answer that lists one or more codecs in response to an outgoing offer, determining whether an incoming offer that corresponds to the outgoing offer lists a codec that matches any of the one or more codecs of the incoming answer, determining whether the incoming offer lists a codec that is related to any of the one or more codecs, and transmitting an outgoing answer listing the related codec, if there is no matching first codec. For certain example embodiments, the related codec has the highest priority of any codec listed in the incoming offer that is related to any of the one or more codecs. For certain example embodiments, the related codec is listed as having the highest priority in the outgoing answer.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

FIG. 3A and FIG. 3B illustrates an incoming offer and outgoing offer pair in accordance with an example embodiment.

FIG. 4A and FIG. 4B illustrates another incoming offer and outgoing offer pair in accordance with an example embodiment.

FIG. 7A, FIG. 7B, FIG. 7C, and FIG. 7D illustrate an incoming offer and outgoing offer pair and a corresponding incoming answer and outgoing answer pair in accordance with an example embodiment.

DETAILED DESCRIPTION

Figure 1:
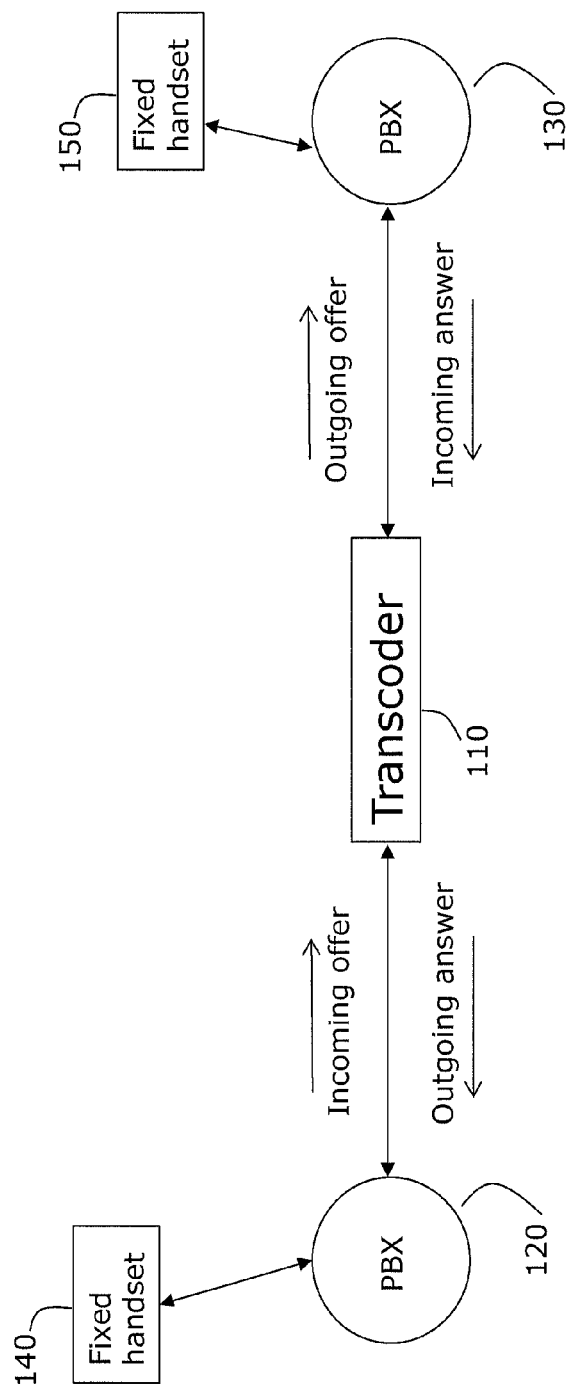
FIG. 1 is a block diagram of a transcoder system providing signaling using SDP for an example embodiment.

A description of example embodiments follows. The teachings of all patents, published applications and references cited herein are incorporated by reference in their entirety.

Transcoders are network equipment that can perform transcoding, which is converting from one coded representation to another, for communication sessions. A session can be a communication between two parties, such as a typical telephone call in telecommunication networks. These networks can include communicative connections to mobile networks, private branch exchanges (PBX), IP PBXs, telephone exchanges, and the public switched telephone network (PSTN), for example. Each of these networks, exchanges, and their associated endpoints, such as fixed telephone landline sets or mobile handsets, can use a variety of different codecs or the same codecs.

Different codecs often have different characteristics. Different codecs, for example, can be sampled at different sampling rates, can use different encoding mechanisms, and can capture different frequency ranges. Many voice codecs are referred to as being either narrowband (NB) codecs, wideband (WB) codecs, or super wideband codecs. Wideband codecs and super wide-band codecs can be referred to collectively as high definition (HD) codecs.

Examples of narrowband codecs include: G711a, G711u, G729, G729a, G729b, AMR-NB, SILK-NB, Opus-NB, G.723.1, G.726, EVRC, EVRC-NW-8, and GSM.

The G711 standard is a narrowband audio codec that samples signals between 300 and 3,400 Hz at a sampling rate of 8 kHz. The two variants of G711 are a-law and u-law, which are two different companding algorithms.

G729 is a narrowband audio codec with a sampling rate of 8 kHz and uses Conjugate Structure Algebraic Code-Excited Linear Prediction (CS-ACELP) coding. G729a is a variant that has a less complex algorithm and a lower voice quality. G729b is another variant that can provide silence suppression.

Adaptive Multi-Rate (AMR or AMR-NB) is a narrowband audio codec that encodes signals in the frequency range 200 to 3,400 Hz with a sampling rate of 8 kHz.

Opus-NB is an audio codec and for certain embodiments can have a sampling rate of 8 kHz.

SILK-NB is an audio codec that can have a sampling rate of 8 kHz.

G.723.1 is a codec for voice that compresses voice audio and has a sampling rate of 8 kHz.

G.726 is a waveform speech codec which uses Adaptive Differential Pulse Code Modulation and has a sampling rate of 8 kHz.

EVRC is a speech codec used in CDMA networks and has a sampling rate of 8 kHz.

EVRC-NW-8 was standardized by the Third Generation Partnership Project 2 (3GPP2) in 2010 and has a speech codec used in CDMA networks with a sampling rate of 8 kHz.

GSM is a standard developed by European Telecommunications Standards Institute (ETSI) which includes a codec for second-generation (2G) mobile phones, and which has a sampling rate of 8kHz.

Examples of wideband or super wideband codecs include: G722, AMR-WB, Opus-WB, SILK-WB, and EVRC-NW-16.

G722 is a wideband audio codec that samples speech in the frequency range of 50 to 7,000 Hz and has a sampling rate of 16 kHz.

Adaptive Multi-Rate Wideband (AMR-WB or G722.2) is a wideband audio codec that samples speech in the frequency range of 50 to 7,000 Hz and has a sampling rate of 16 kHz. AMR-WB is based on adaptive multi-rate encoding.

Opus-WB is a wideband audio codec and for certain embodiments can have a sampling rate up to 48 kHz (called full band also) and a 20 kHz frequency range.

SILK-WB is a super wideband audio codec that can sample speech in a frequency range of 70 to 12,000 Hz with a variable sampling rate of 16 or 24 kHz.

EVRC-NW-16 was standardized by the 3GPP2 in 2010 and has a speech codec used in CDMA networks with a sampling rate of 16kHz.

Many communication systems that employ transcoders also employ SIP to facilitate communications. SIP utilizes SDP, which helps to identify and negotiate which codec(s) are used for the session, among other things. SDP uses an offer/answer model to negotiate media streams based on end to end endpoint capabilities. Examples of these models include Request for Comments (RFC) 3264 published in 1998 by the Internet Engineering Task Force (IETF) and RFC 4566 published by IETF in 2006 as a revision of RFC 3264. The teachings of these RFCs are incorporated by reference herein.

SDP can be used for negotiating between endpoints a number of session parameters, including which codec is preferred to use. Example embodiments of the present disclosure, can be employed in communication networks (e.g. for fixed and wireless networks or Over the Top (OTT) applications) that employ offer/answer models, such as SDP to negotiate which codecs to preferably use.

Example embodiments of the present disclosure can try to optimize voice or video calls by providing for transcoding between codecs in the same family or for transcoder free operation (i.e. the same codec is used), where possible. Example embodiments of the present disclosure also can try to optimize voice or video calls by providing for transcoding between high definition codecs, or between narrowband codecs, from end to end, where it is possible, rather than mixing narrowband and high definition codecs for a session.

FIG. 1 is a block diagram of an example system that can employ SIP to initiate and set up calls and SDP to, among other things, identify and negotiate codecs to use. This block diagram is applicable to other offer/answer models for negotiating codecs and is not limited to networks using SIP. An example of the SDP flow for negotiating codecs can include an offer from a first fixed handset 140 where the offer lists each of the codecs that the first fixed handset 140 has the capability to use, such as G711u and G729a. The offer also prioritizes the first fixed handset's 140 preferred codec by listing the codec with the highest priority first in the offer, which is G711u for this example. The codec with the second highest priority to use is listed second (G729a).

The offer can transverse any number of intermediate devices, such as a PBX 120 or a Central Office switch, before reaching the transcoder 110. The offer as input to the transcoder 110 can be referred to as the incoming offer, with the transcoder 110 being the point of reference. The transcoder 110 can pass the offer transparently (G711u and G729a for this example) or in accordance with example embodiments of this disclosure can augment the listing, including with codecs related to codecs already listed in the offer (G711u and G729a).

Codecs are related, also referred to as being part of the same family of codecs, if the codecs share sufficient characteristics so as to allow for significantly more efficient transcoding or significantly higher voice quality when transcoding between them as compared to transcoding between unrelated codecs, including for example codecs with similar encoding/decoding algorithms and sampled at the same rate. Examples of codec families include (1) the G711 family which includes G711a and G711u, (2) the G729 family which includes G729, G729a, and G729b, and (3) the high definition codecs, which collectively can be referred to as a family and considered related for embodiments of this disclosure, and which include AMR-WB, Opus-WB, G722, SILK-WB, and EVRC-NW-16. The G711 family is unrelated to the G729 family and both are unrelated to the family of high definition codecs. Additionally, for certain example embodiments, it can be preferred to transcode between narrowband codecs rather than transcode between a narrowband and a high definition codec.

Referring again to FIG. 1, example embodiments can augment the listing of the incoming offer, including with codecs related to codecs already listed in the offer (G711u and G729a). For example, a transcoder 110 configured in accordance with embodiments of the present disclosure, can add G711a, which is related to G711u, and can add G729b, which is related to G729a, to the listing. The transcoder 110 can then transmit the offer with the modified list to a second endpoint 150 (e.g. the other party to the call). The offer can transverse any number of intermediate devices, such as a second PBX 130 or a Central Office switch, before reaching the second endpoint 150, which is shown for this example as a fixed handset 150.

The offer as output from the transcoder 110 can be referred to as the outgoing offer. The outgoing offer can list the G711u, G711a, G729a, and G729b codecs. Example embodiments add the related codecs to the list for the outgoing offer by adding the related codecs in the same family with similar priority settings. Thus, the added G711a has a lower priority than then its family members that were in the incoming offer list (G711u), but a higher priority than unrelated codecs, such as the G729a codec, which was in the incoming offer list, and G729b, which was added by the transcoder 110.

As for another example embodiment, if the incoming offer lists AMR-WB, AMR-NB, and G711u, then the outgoing offer would list AMR-WB, G722, Opus-WB, SILK-WB, EVRC-NW-16, AMR-NB, G711u, and G711a. Thus, if the termination endpoint supports high definition codecs, the call will be high definition end to end, assuming all HD codecs are listed. Additionally, for certain example embodiments, the ordering of the high definition codecs within themselves may vary.

As for yet another example embodiment, besides adding to the list all of the remaining narrowband codecs that are related to narrowband codecs that are listed already in the incoming offer, additional families of narrowband codecs where none of the family is listed in the incoming offer can also be added, such as to the bottom of the list, for the outgoing offer.

For an additional example embodiment, besides adding to the list all of the remaining high definition codecs when at least one high definition codec is listed in the incoming offer, the narrowband codecs that are related to narrowband codecs that are listed already in the incoming offer can also be added, as well as additional families of narrowband codecs where none of the family is listed in the incoming offer can also be added, such as to the bottom of the list, for the outgoing offer.

Figure 2:
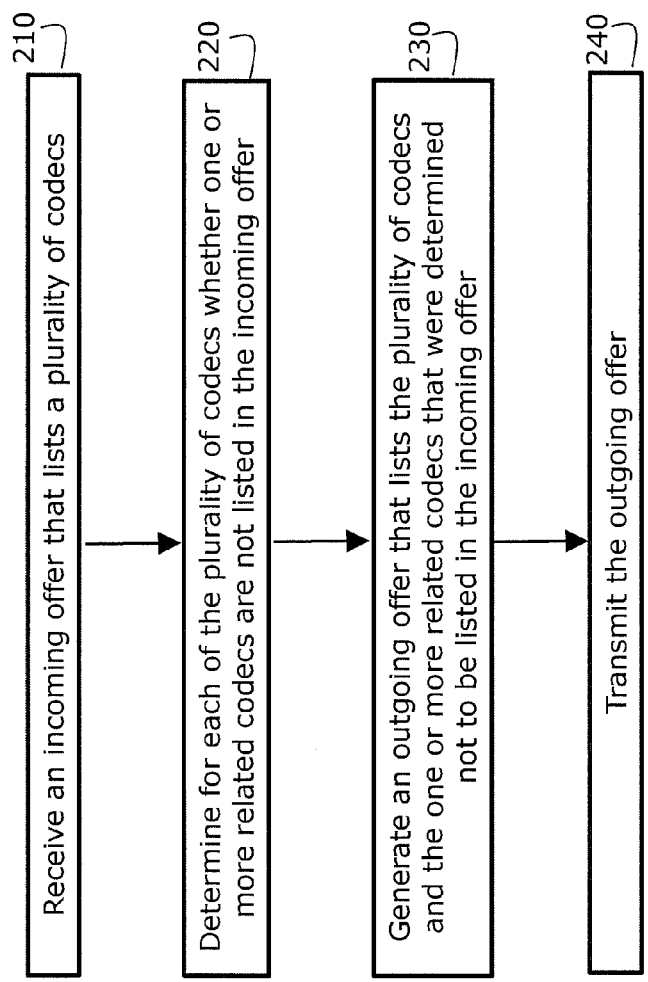
FIG. 2 is a flow diagram illustrating an example embodiment of a method for listing codecs for an outgoing offer.

FIG. 2 is a flow diagram illustrating an example method for listing codecs for an outgoing offer in accordance with an embodiment of the present disclosure. An incoming offer that lists a plurality of codecs is received 210. For each of the plurality of codecs, it is determined 220 whether one or more related codecs are not listed in the incoming offer. Then, an outgoing offer that lists the plurality of codecs and the one or more related codecs that were determined not to be listed in the incoming offer is generated 230. The outgoing offer can then be transmitted 240, such as to the endpoint terminating a call.

Example methods can also include maintaining the order of the plurality of codecs that were listed in the incoming offer as the order of the plurality of codecs in the outgoing offer. The order is where the codecs occur in the list with the highest priority codec being listed first. Example methods can also include generating an outgoing offer that lists the plurality of codecs and that lists the one or more related codecs, if they are not already listed in the outgoing offer, after each of the plurality of codecs to which they relate, after any of the plurality of codecs that are related to the one or more related codecs, and before a next unrelated codec of the plurality of codecs.

FIGS. 3A and 3B illustrates an incoming offer and outgoing offer pair in accordance with an example embodiment. FIG. 3A shows an example script 300 for an incoming offer in accordance with an example embodiment. The example script 300 contains an ordering of codecs which is provided by the "m=audio 47980 RTP/AVP 100 104 103" line 310 in the script 300. This line 310 provides the ordering of the codecs for this example embodiment by providing an ordered list of labels (i.e. 100, 104, 103) that corresponds to a preferred ordering of the codecs. The preferred ordering can be whatever is desired for a particular application. For this example embodiment, the codec with the highest priority is listed first in the list followed by the next highest priority codec, etc. until the codec with the lowest priority is listed last in the list. Additional example embodiments can indicate the ordering of codecs in other ways, such as omitting the line 310 having the ordered list of labels and instead indicate priority by which codec is listed first in the script 300, which can denote the highest priority, with each additional codec listed in the script having the preference in the order of which they appear.

The codecs to which the labels correspond are identified on additional lines 321-323 in the example script 300. Specifically, the line 321 which is "a=rtpmap:100 SILK_V3/24000" provides that the SILK_V3 which is a super wide band codec corresponds to the label "100". The line 322 which is "a=rtpmap:104 SILK_WB_V3/16000" provides that label "104" corresponds to the SILK_WB_V3 wideband codec. The line 323 which is "a=rtpmap:103 SILK_NB_V3/8000" provides that label "103" corresponds to the SILK_NB_V3 narrowband codec.

FIG. 3B shows a script 350 of the outgoing offer corresponding to the incoming offer depicted in FIG. 3A, in accordance with this example embodiment. The order of the priority for the codes is provided in the outgoing offer like it was for the incoming offer for this example embodiment. Specifically, the script 350 for the outgoing offer includes a line 360, which is "m=audio 22218 RTP/AVP 100 104 113 9 103 0 8", that provides an ordered list of labels (i.e. 100 104 113 9 103 0 8) that corresponds to a preferred ordering of the codecs. In accordance with example embodiments, the outgoing offer ordered list includes codecs that were added to the list of the incoming offer. As with the incoming offer, the script 350 for the outgoing offer also includes lines 371-377 identifying to which codecs the labels of the ordered list correspond. For this example embodiment, additional wideband codecs, AMR-WB and G722, were added to the outgoing ordered list after the wideband codecs listed in the incoming offer. PCMu and PCMa codecs were added to the outgoing ordered list after the SILK-NB of the incoming list.

FIG. 4A and FIG. 4B illustrates another incoming offer and outgoing offer pair in accordance with an example embodiment. FIG. 4A shows an example script 401 for an incoming offer in accordance with an example embodiment. The example script 401 contains an ordering of codecs which is provided by the "m=audio 47980 RTP/AVP 8" line 410 in the script 401. This line 410 provides the ordering of the codecs for this example embodiment by providing an ordered list of a label (i.e. 8) that corresponds to a preferred ordering of the codecs. The codec to which the label corresponds is identified on an additional line 411 in the example script 401. Specifically, the line 411 which is "a=rtpmap:8 pcma/8000" provides that the PCMa, which is a narrowband codec, corresponds to the label "8".

FIG. 4B shows a script 402 of the outgoing offer corresponding to the incoming offer depicted in FIG. 4A, in accordance with this example embodiment. The order of the priority for the codecs is provided in the outgoing offer like it was for the incoming offer for this example embodiment. Specifically, the script 402 for the outgoing offer includes a line 420, which is "m=audio 22218 RTP/AVP 8 0 18 104", that provides an ordered list of labels (i.e. 8 0 18 104) that corresponds to a preferred ordering of the codecs. In accordance with example embodiments, the outgoing offer ordered list includes codecs that were added to the list of the incoming offer. As with the incoming offer, the script 402 for the outgoing offer also includes lines 421-426 identifying to which codecs the labels of the outgoing ordered list correspond. For this example embodiment, additional codecs, PCMu, G729, and G729b, were added to the outgoing ordered list. PCMu (label 0) was added first after the PCMa codec (label 8) because it is related to the PCMa codec in accordance with the example embodiment.

As shown above, the related codecs can be added to the list for the outgoing offer having the similar priority as the codec family members that were listed in the incoming offer. If two family members were listed in the incoming offer, then a third related codec can be listed third after the codecs of that family that were listed in the incoming offer. Also, for this example embodiment, the same codec should not be listed more than once for the same stream.

Certain example methods can also include listing families of codecs in the outgoing offer when none of the family of codecs is listed in the incoming offer. For example, if neither G711a or G711u were listed in the incoming offer, they can be listed at the bottom of the list (i.e. lowest priority) in the outgoing offer. Certain example methods can also include listing a first high definition codec in the outgoing offer that is not listed in the incoming offer when a second high definition codec is listed in the incoming offer. As discussed above, the high definition codecs can be consider to be a family of codecs, and thus, remaining family members can be added to the list for the outgoing offer for certain example embodiments.

Figure 5:
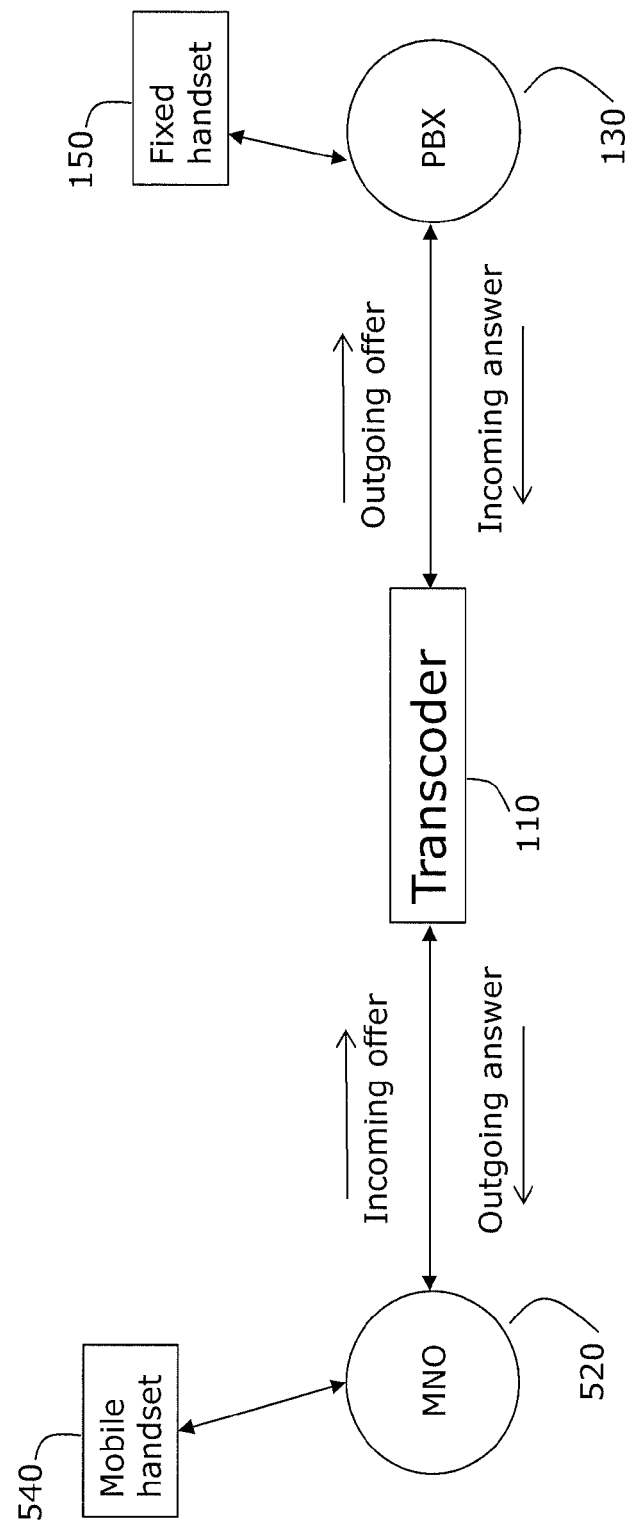
FIG. 5 is a block diagram of a transcoder system providing signaling using SDP for an example embodiment having a mobile endpoint.

FIG. 5 is a block diagram of a transcoder system providing signaling using SDP for an example embodiment according to the present disclosure having a mobile endpoint 540. Transcoders 110 in accordance with example embodiments also can optimize codec selection as it relates to selecting better answers in the offer/answer model.

FIG. 5 illustrates when a call is originated from a mobile handset 540 from a Mobile Network Operator (MNO) 520, such as in a 3G or LTE domain. A mobile handset 540 typically supports mobile codecs, such as GSM, AMR-WB, AMR-NB, EVRC, EVRC-NW-8, EVRC-NW-16, etc. These mobile codecs are not typically supported by fixed networks 130. When a call originates from a mobile handset 540 and an incoming offer is sent to a transcoder 110, the transcoder 110 can add codecs to the outgoing offer in accordance with example embodiments described above. However, when the incoming answer is received by the transcoder 110, the transcoder 110 can also decide the most optimal codec for use with the handset 540 for best quality, in accordance with example embodiments. The transcoder 110 can then transmit the outgoing answer listing the most optimal codec.

For typical transcoders not having the benefits of the present disclosure, if there is no codec match, the typical transcoders will pick the codec with the highest priority in the incoming offer, which can cause non-optimal transcoding. For example, if a high definition (HD) mobile handset 540 in a mobile network 520, such as a LTE network, is making a call, the handset 540 will typically send an incoming offer with codecs such as AMR-WB and AMR-NB. If the call is sent to a narrowband fixed handset 150, it likely will not have the capability for these mobile codecs, and a fixed network codec, such as G711u, likely will be selected by the typical transcoder not having the benefits of the present disclosure.

Even if the offer augmentation of the transcoder 110 in accordance with example embodiments is used, the limited capabilities of a fixed handset 150 can lead to non-optimal transcoding. For example, in example embodiments the transcoder 110 can augment the incoming offer and provide an outgoing offer of AMR-WB, G722, Opus-WB, SILK-WB, EVRC-NW-16, AMR-NB, G711u, G711a, G729, G729a, G729b, G.723.1, G.726, EVRC, GSM, and EVRC-NW-8. However, the limited capabilities of a typical fixed handset 150 can still cause an incoming answer to be G711u, for example.

If the incoming answer is G711u, there is no match to the incoming offer from the mobile handset 540. When there is no match, a typical transcoder not having the benefits of example embodiments of the present disclosure, would select AMR-WB, which is the highest priority codec in the incoming offer. Such a selection would result in transcoding between a high definition codec and non-high definition codec, which is not optimal.

To avoid this, the transcoder 110 in accordance with example embodiments of the present disclosure can select a narrowband codec from the incoming offer so that the voice call is non-high definition end to end. So for this example, the transcoder 110 would select the highest priority narrowband codec in the incoming offer, which is AMR-NB, and transmit an outgoing answer of AMR-NB. Thus, the transcoding will be between AMR-NB and G711u. The offerer has higher priority when it comes to codec selection for SDP. Likewise, when a fixed handset originates a call to a mobile handset, similar analysis can occur and provide for G711u to AMR-NB transcoding.

Having the narrowband codecs be end to end helps maintain the voice quality and better utilization of transcoding resources. Transcoding between different narrowband codecs results in less degradation of voice as compared to transcoding between a wideband codec and a narrowband codec. Further, extra resources are required to transcode between a wideband codec and a narrowband codec.

Furthermore, transcoding between related codecs can provide for less degradation of voice and less transcoder resources as compared to transcoding between unrelated codecs. For example, transcoding between G711a and G711u can be preferred over transcoding between AMR-NB and G711u. Example embodiments of the present disclosure can employ logic similar to that described above to have the transcoder 110 send an outgoing answer having a related codec as the selected priority codec, where available.

Figure 6:
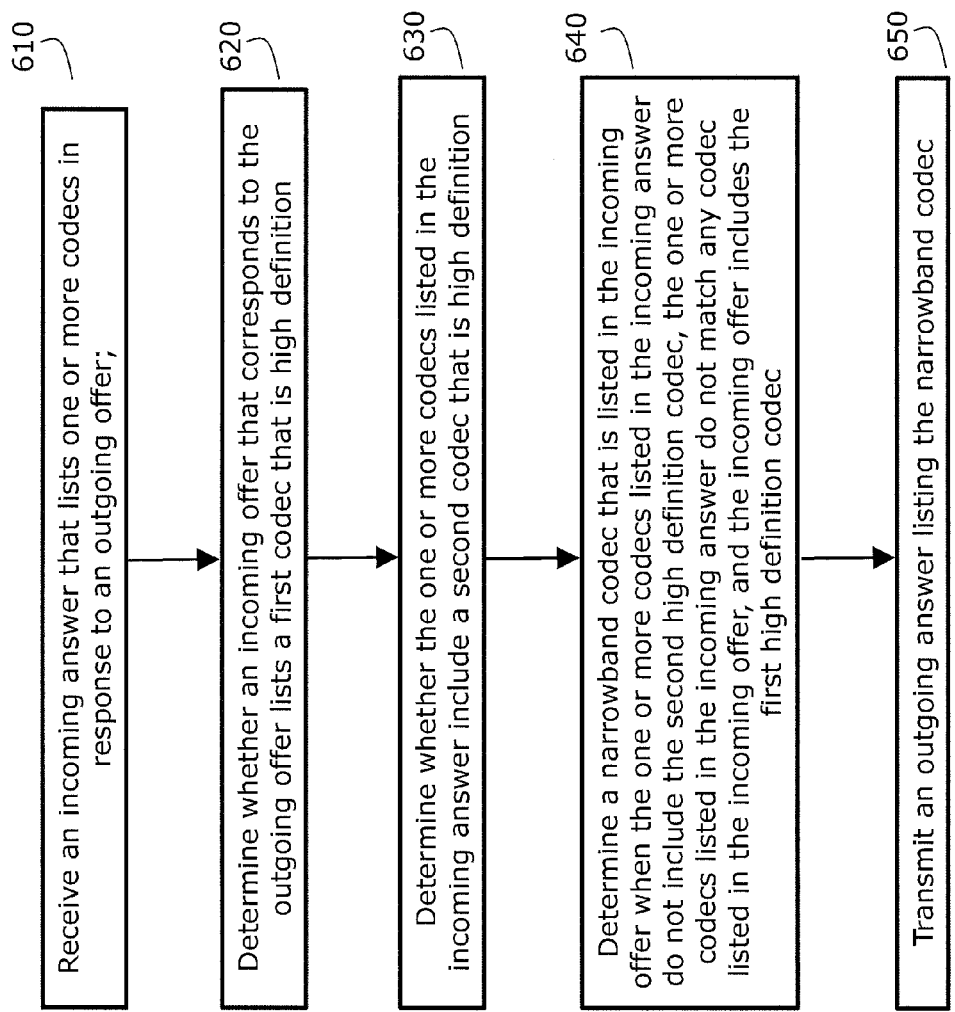
FIG. 6 is a flow diagram illustrating an example embodiment of a method for a transcoder to provide a listing of codecs in an outgoing answer.

FIG. 6 is a flow diagram illustrating an example embodiment of a method for a transcoder to provide a listing of codecs in an outgoing answer. An incoming answer that lists one or more codecs in response to an outgoing offer is received 610. Whether a first endpoint (the offerer for the session for this example) has high definition capability is determined 620 from whether the corresponding incoming offer lists a high definition codec. Whether the other endpoint has high definition capability is also determined 630, but from whether the incoming answer includes a high definition codec. When the first endpoint has high definition capability, but the other endpoint does not, and none of the codecs for the endpoints match, the example method determines 640 a narrowband codec capability of the first endpoint from the incoming offer. This narrowband codec is then transmitted 650 as the outgoing answer listing the narrowband codec to the first endpoint. If just the narrowband codec is listed in the outgoing answer, the first endpoint will not send data to the transcoder in high definition which is more efficient because the second endpoint does not have high definition capability.

For certain embodiments of this example method, the narrowband codec is listed with a highest priority in the outgoing answer. For certain embodiments of this example method, the narrowband codec is listed with a highest priority in the incoming answer.

FIGS. 7A, 7B, 7C, and 7D illustrate an incoming offer and outgoing offer pair (7A and 7B) and a corresponding incoming answer and outgoing answer pair (7C and 7D) in accordance with an example embodiment. FIG. 7A illustrates a script 701 for an incoming offer in accordance with an example embodiment. The example script 701 contains an ordering of codecs which is provided by the "m=audio 47980 RTP/AVP 113 0" line 710 in the script 701. This line 710 provides the ordering of the codecs for this example embodiment by providing an ordered list of labels (i.e. 113 0) that correspond to a preferred ordering of the codecs. The codecs to which the labels correspond are identified on additional lines in the example script 701. Specifically, the line 711 which is "a=rtpmap:113 AMR-WB/16000" provides that the AMR-WB codec corresponds to the label "113" and is the highest priority codec for this endpoint, such as a mobile handset. The second label, "0", corresponds to the PCMu codec, as shown by the line 712 which is "a=rtpmap:0 pcmu/8000".

In accordance with example embodiments, FIG. 7B shows a script 702 of the outgoing offer corresponding to the incoming offer depicted in FIG. 7A, which adds additional codecs to the ordered list. The order of the preference for the codes is provided in the outgoing offer like it was for the incoming offer for this example embodiment. Specifically, the script 702 for the outgoing offer includes a line 720, which is "m=audio 22218 RTP/AVP 113 9 100 104 105 0 8", that provides an ordered list of labels (i.e. 113 9 100 104 105 0 8) that corresponds to a preferred ordering of the codecs. In accordance with example embodiments, the outgoing offer ordered list includes codecs that were added to the list of the incoming offer. As with the incoming offer, the script 702 for the outgoing offer also includes lines 721-727 identifying to which codecs the labels of the outgoing ordered list correspond. For this example embodiment, additional wideband codecs, G722, SILK_V3, SILK-WB_V3, and Opus were added to the ordered list after the AMR-WB codec, and PCMa was added to the outgoing ordered list. The AMR-WB remains the wideband codec with the highest priority and the PCMu remains as the codec with the highest priority for narrowband codecs. For yet other additional embodiments, more wideband codecs can be added and more narrowband codecs can be added to the outgoing offer list.

FIG. 7C illustrates the incoming answer script 703 from the second endpoint 150 that can be received at the transcoder 110, in accordance with the example embodiment. The script 703 contains an ordered list of codecs for priority of one label, "8", at the line 730 which is "m=audio 22218 RTP/AVP 8". The script also identifies that the codec is PCMa at the line 731 which is "a=rtpmap:8 pcma/8000." Thus, the second endpoint can support the PCMa codec.

FIG. 7D illustrates an example script 704 of the outgoing answer from the transcoder 110 to the first endpoint 540, in accordance with this example embodiment. This script 704 lists the PCMu codec, in accordance with an example embodiment, via the lines 740, 741 "m=audio 222 RTP/AVP 0" and "a=rtpmap:0 pcmu/8000". PCMu was selected because (1) based on the incoming answer, the second endpoint does not support a high definition codec (it instead only supports a narrowband codec), and (2) there were no matching codecs between the incoming offer from the first endpoint and the incoming answer from the second endpoint. If there were a matching narrowband codec between the incoming offer and incoming answer, that matching narrowband codec can be selected to have the highest priority. The first endpoint supports PCMu and the second endpoint supports PCMa, thus the transcoder 110 translates between these two narrowband codecs, which for this example are related. Thus, resources are conserved as compared to traditional systems that select the highest priority codec when there is no match. In alternative embodiments, if there is no matching codecs between the endpoints, and the endpoints each support a high definition codec, then a supported HD codec can be selected for each endpoint via the lists and the transcoder 110 can translate between the HD codecs, thus, providing HD service for the call.

Figure 8:
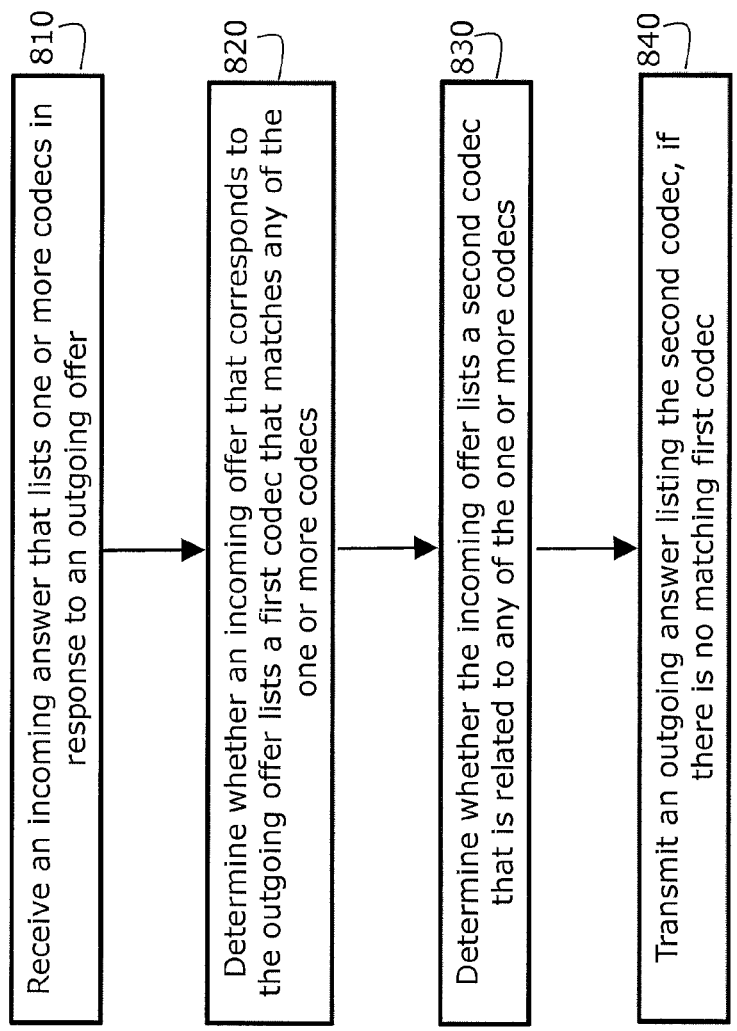
FIG. 8 is a flow diagram illustrating another example embodiment of a method for a transcoder to provide a listing of codecs in an outgoing answer.

FIG. 8 is a flow diagram illustrating another example embodiment of a method for a transcoder to provide an effective listing of codecs in an outgoing answer. An incoming answer is received 810 that lists one or more codecs in response to an outgoing offer. Whether the corresponding incoming offer lists a codec that matches any of the one or more codecs in the incoming answer is determined 820. It is also determined 830 whether the incoming offer lists a codec that is related to any of the one or more codecs in the incoming answer. If there is no matching codecs, an outgoing answer listing the related codec is transmitted 840. This example method provides for the use of related codecs when no codecs of the endpoints match. Transcoding related codecs is more efficient than transcoding unrelated codecs, generally.

For certain embodiments of this example method, the related codec has the highest priority of any codec listed in the incoming offer that is related to any of the one or more codecs in the incoming answer. For certain embodiments of this example method, the related codec is listed as having the highest priority (i.e. the first codec listed) in the outgoing answer.

The above discussed offer/answer model can occur anytime during the call flow and is not limited to just the initial setup or invite transaction. The example embodiments of the present disclosure are applicable to each of these occurrences during the call, as well as having multiple answers received. Furthermore, the example embodiments are applicable to video and other codecs and not just audio or voice codecs.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein. The software instructions may also be modularized. These modules can be combined or separated into additional modules for certain example embodiments.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way. Accordingly, further embodiments may also be implemented in a variety of computer architectures, physical, virtual, cloud computers, and/or some combination thereof, and, thus, the data processors described herein are intended for purposes of illustration only and not as a limitation of the embodiments. While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method comprising:
    receiving an incoming offer that lists a plurality of codecs;
    determining for each of the plurality of codecs whether one or more related codecs are not listed in the incoming offer;
    generating an outgoing offer that lists the plurality of codecs and the one or more related codecs determined not to be listed in the incoming offer; and
    transmitting the outgoing offer.

2. The method of claim 1 further comprising maintaining an order of the plurality of codecs from the incoming offer as the order of the plurality of codecs in the outgoing offer.

3. The method of claim 1 wherein generating an outgoing offer that lists the plurality of codecs and the one or more related codecs includes generating an outgoing offer that lists the plurality of codecs and that lists the one or more related codecs, if they are not already listed in the outgoing offer, after each of the plurality of codecs to which they relate, after any of the plurality of codecs that are related to the one or more related codecs, and before a next unrelated codec of the plurality of codecs.

4. The method of claim 1 further comprising listing one or more of a family of codecs in the outgoing offer when none of the family of codecs is listed in the incoming offer.

5. The method of claim 1 further comprising listing a first high definition codec in the outgoing offer that is not listed in the incoming offer when a second high definition codec is listed in the incoming offer.

6. The method of claim 5 wherein the first high definition codec is listed next after the second high definition codec in the outgoing offer.

7. The method of claim 5 wherein the first high definition codec and second high definition codec are each selected from the group consisting of AMR-WB, OPUS-WB, G722, EVRC-NW-16, and SILK-WB.

8. The method of claim 1 further comprising listing a first narrowband codec in the outgoing offer that is not listed in the incoming offer when a second narrowband codec is listed in the incoming offer.

9. The method of claim 8 wherein the first narrowband codec is listed next after the second narrowband codec in the outgoing offer.

10. The method of claim 9 wherein the first narrowband codec and second narrowband are each selected from the group consisting of AMR-NB, G711a, G711u, G729, G729a, G729b, G.723.1, G.726, EVRC, GSM, EVRC-NW-8, SILK-NB, and Opus-NB.

11. An apparatus comprising:
    a transcoder configured to:
        receive an incoming offer that lists a plurality of codecs;
        determine for each of the plurality of codecs whether one or more related codecs are not listed in the incoming offer;
        generate an outgoing offer that lists the plurality of codecs and the one or more related codecs determined not to be listed in the incoming offer; and
        transmit the outgoing offer.

12. The apparatus of claim 11 wherein the transcoder being configured to generate an outgoing offer that lists the plurality of codecs and the one or more related codecs includes being configured to generate an outgoing offer that lists the plurality of codecs and that lists the one or more related codecs, if they are not already listed in the outgoing offer, after each of the plurality of codecs to which they relate, after any of the plurality of codecs that are related to the one or more related codecs, and before a next unrelated codec of the plurality of codecs.

13. A method for a transcoder to provide a listing of codecs, comprising:
    receiving an incoming answer that lists one or more codecs in response to an outgoing offer;
    determining whether an incoming offer that corresponds to the outgoing offer lists a first high definition codec;
    determining whether the one or more codecs listed in the incoming answer include a second high definition codec;
    determining a narrowband codec that is listed in the incoming offer when the one or more codecs listed in the incoming answer do not include the second high definition codec, the one or more codecs listed in the incoming answer do not match any codec listed in the incoming offer, and the incoming offer includes the first high definition codec; and
    transmitting an outgoing answer listing the narrowband codec.

14. The method of claim 13 wherein the narrowband codec is listed first in the outgoing answer.

15. The method of claim 13 wherein the narrowband codec is listed first in the incoming answer.

16. The method of claim 13 wherein the first high definition codec and second high definition codec are each selected from the group consisting of AMR-WB, OPUS-WB, G722, EVRC-NW-16, and SILK-WB.

17. The method of claim 13 wherein the narrowband codec is selected from the group consisting of AMR-NB, G71 la, G711u, G729, G729a, G729b, G.723.1, G.726, EVRC, GSM, EVRC-NW-8, SILK-NB, and Opus-NB.

18. An apparatus for the listing of codecs, comprising:
    a transcoder configured to:
        receive an incoming answer that lists one or more codecs in response to an outgoing offer;
        determine whether an incoming offer that corresponds to the outgoing offer lists a first codec that is high definition;

determine whether the one or more codecs listed in the incoming answer include a second codec that is high definition;

determine a narrowband codec that is listed in the incoming offer when the one or more codecs listed in the incoming answer do not include the second codec that is high definition and the incoming offer includes the first codec that is high definition; and transmit an outgoing answer listing the narrowband codec.

19. A method for a transcoder to provide for listing of codecs, comprising:

receiving an incoming answer that lists one or more codecs in response to an outgoing offer;

determining whether an incoming offer that corresponds to the outgoing offer lists a first codec that matches any of the one or more codecs;

determining whether the incoming offer lists a second codec that is related to any of the one or more codecs; and transmitting an outgoing answer listing the second codec, if there is no matching first codec.

20. The method of claim 19 wherein the second codec is listed before any codec listed in the incoming offer that is related to any of the one or more codecs.

21. The method of claim 19 wherein the second codec is listed first in the outgoing answer.

\* \* \* \* \*

UNITED STATES PATENT AND TRADEMARK OFFICE
CERTIFICATE OF CORRECTION

PATENT NO. : 9,961,209 B2  
APPLICATION NO. : 14/751645  
DATED : May 1, 2018  
INVENTOR(S) : Manpreet Singh Page 1 of 1

It is certified that error appears in the above-identified patent and that said Letters Patent is hereby corrected as shown below:

In the Claims

In Column 14, Line 59, Claim 17, delete "G71 1a" and insert -- G711a --.

Signed and Sealed this  
Nineteenth Day of June, 2018

Andrei Iancu  
*Director of the United States Patent and Trademark Office*